(12) United States Patent
Kudva et al.

(10) Patent No.: US 11,784,835 B2
(45) Date of Patent: Oct. 10, 2023

(54) DETECTION AND MITIGATION OF UNSTABLE CELLS IN UNCLONABLE CELL ARRAY

(71) Applicant: NVIDIA Corp., Santa Clara, CA (US)

(72) Inventors: Sudhir Shrikantha Kudva, Dublin, CA (US); Nikola Nedovic, San Jose, CA (US); Carl Thomas Gray, Apex, NC (US); Stephen G Tell, Chapel Hill, NC (US)

(73) Assignee: NVIDIA CORP., Santa Clara, CA (US)

( * ) Notice: Subject to any disclaimer, the term of this patent is extended or adjusted under 35 U.S.C. 154(b) by 90 days.

(21) Appl. No.: 17/481,154

(22) Filed: Sep. 21, 2021

(65) Prior Publication Data

US 2022/0271952 A1     Aug. 25, 2022

Related U.S. Application Data

(63) Continuation-in-part of application No. 17/184,396, filed on Feb. 24, 2021, now Pat. No. 11,411,563.

(51) Int. Cl.
*H04L 9/32*     (2006.01)
*H04L 9/08*     (2006.01)

(52) U.S. Cl.
CPC .......... *H04L 9/3278* (2013.01); *H04L 9/0825* (2013.01); *H04L 9/0861* (2013.01); *H04L 2209/12* (2013.01)

(58) Field of Classification Search
CPC .......... H03K 19/173; H03K 19/17708; H03K 19/17748; H03K 19/17756; H03K 19/17768; H04L 9/0861; H04L 9/32; H04L 9/3278
See application file for complete search history.

(56) References Cited

U.S. PATENT DOCUMENTS

| | | |
|---|---|---|
| 6,118,869 A | 9/2000 | Kelem et al. |
| 6,873,551 B2 | 3/2005 | Bedarida et al. |
| 7,492,630 B2 | 2/2009 | Scheuerlein et al. |
| 7,495,947 B2 | 2/2009 | Scheuerlein et al. |
| 7,522,448 B2 | 4/2009 | Scheuerlein et al. |
| 7,719,874 B2 | 5/2010 | Scheuerlein et al. |
| 8,981,810 B1 | 3/2015 | Trimberger et al. |
| 9,213,835 B2 | 12/2015 | Lesea et al. |

(Continued)

FOREIGN PATENT DOCUMENTS

| | | |
|---|---|---|
| CN | 110020557 A | 7/2019 |
| CN | 108734030 B | 7/2020 |

(Continued)

OTHER PUBLICATIONS

20-Sc-0535TW01 Official Communication Taiwan Intellectual Property Office First Office Action dated Apr. 7, 2022.

(Continued)

*Primary Examiner* — Jason Crawford

(74) *Attorney, Agent, or Firm* — Rowan TELS LLC

(57) ABSTRACT

A circuit includes a set of multiple bit generating cells. One or more adjustable characterization circuits are coupled to inputs to the bit generating cells to affect the outputs of the bit generating cells. Based on the effect of the characterization circuit(s) on the outputs of the bit generating cells, a subset less than all of the bit generating cells is selected.

19 Claims, 16 Drawing Sheets

(56) References Cited

U.S. PATENT DOCUMENTS

| | | | |
|---|---|---|---|
| 9,276,583 B1* | 3/2016 | Satpathy | H03K 19/17768 |
| 9,279,856 B2 | 3/2016 | Laackmann et al. | |
| 9,355,743 B2 | 5/2016 | Ghosh et al. | |
| 9,369,277 B2 | 6/2016 | Augustine et al. | |
| 9,698,611 B2 | 7/2017 | Li et al. | |
| 9,947,391 B1 | 4/2018 | Mahatme et al. | |
| 10,224,931 B1* | 3/2019 | Wang | H04L 9/0866 |
| 10,439,613 B2* | 10/2019 | Karpinskyy | H04L 9/0866 |
| 10,439,829 B1 | 10/2019 | Lin et al. | |
| 10,553,886 B2 | 2/2020 | Buelte et al. | |
| 10,574,469 B1 | 2/2020 | Garni et al. | |
| 10,644,712 B2 | 5/2020 | Cai et al. | |
| 10,714,199 B1* | 7/2020 | Bill | H04L 9/3278 |
| 10,764,069 B1* | 9/2020 | Hurwitz | H04L 9/0866 |
| 11,171,793 B2 | 11/2021 | Schat | |
| 11,411,563 B1* | 8/2022 | Kudva | H04L 9/0819 |
| 2002/0170146 A1 | 11/2002 | Thompson | |
| 2015/0192637 A1 | 7/2015 | Falk et al. | |
| 2016/0285639 A1 | 9/2016 | Mathew et al. | |
| 2016/0329897 A1 | 11/2016 | Gu | |
| 2017/0047917 A1 | 2/2017 | Heo et al. | |
| 2017/0272258 A1* | 9/2017 | Tanamoto | G11C 11/1675 |
| 2018/0218177 A1* | 8/2018 | Kuenemund | H04L 9/0861 |
| 2019/0068190 A1 | 2/2019 | Karpinskyy et al. | |
| 2019/0165956 A1* | 5/2019 | Adham | H04L 9/0838 |
| 2020/0044872 A1* | 2/2020 | Willsch | H04L 9/3278 |
| 2021/0135886 A1* | 5/2021 | Lee | H04L 9/0866 |
| 2021/0328818 A1* | 10/2021 | Sonntag | G11C 7/24 |
| 2021/0336804 A1 | 10/2021 | Parhi et al. | |
| 2022/0052691 A1* | 2/2022 | Borrel | H03K 19/00384 |
| 2022/0271752 A1* | 8/2022 | Kudva | H03K 19/17756 |
| 2022/0271951 A1* | 8/2022 | Kudva | H03K 19/17768 |
| 2022/0271952 A1* | 8/2022 | Kudva | H03K 19/17748 |

FOREIGN PATENT DOCUMENTS

| | | |
|---|---|---|
| CN | 111723408 A | 9/2020 |
| EP | 3640945 B1 | 3/2021 |

OTHER PUBLICATIONS

NPL_MATTHEW et al _ "PVT-Variation-Tolerant Hybrid Physically Unclonable Function Circuit for 100% Stable Secure Key Generation in 22nm CMOS" _ Feb. 11, 2014_pp. 278-280 unselected.
108-0436-TW_2022-07-14_Second Office Action.
Npl_Alam et al_ Challenges and Opportunities in Analog and Mixed Signal(AMS) Integrated Circuit (IC) Security_11272017_ pp. 16-32_Department of Electrical and Computer Engineering, University of Florida, Gainesville, FL 32603, USA.
U.S. Appl. No. 17/546,438, filed Dec. 9, 2021, Sudhir Shrikantha Kudva, Entire Document.
Calin et al, Upset Hardened Memory Design for Submicron CMOS Technology, IEEE Transactions on Nuclear Science, Dec. 1996, pp. 2874-2878, vol. 43, No. 6, Grenoble, France.
He et al, An Automatic Self-Checking and Healing Physically Unclonable Function (PUF), ISSCC 2021, Rice University, Houston, TX.
Shifman et al, A Method to Improve Reliability in a 65-nm SRAM PUF Array, IEEE Solid-State Circuits Letters, Jun. 2018, pp. 138-141, vol. 1, No. 6.
Su et al, A Digital 1.6 pJ/bit Chip Identification Circuit Using Process Variations, IEEE Journal of Solid-State Circuits, Jan. 2008, pp. 69-77, vol. 43, No. 1.
Yang et al, A Physically Unclonable Function with BER $<10^{\wedge}8$ for Robust Chip Authentication Using Oscillator Collapse in 40nm CMOS, ISSCC 2015, University of Michigan, Ann Arbor, MI.

* cited by examiner

DETECTION AND MITIGATION OF UNSTABLE CELLS IN UNCLONABLE CELL ARRAY

CROSS REFERENCE TO RELATED APPLICATIONS

This application claims priority and benefit as a continuation-in-part of U.S. application Ser. No. 17/184,396, "Detection and mitigation of unstable cells in unclonable cell array", filed on Feb. 24, 2021, the contents of which are incorporated herein by reference in their entirety.

BACKGROUND

A conventional bit generating cell 100 is depicted in FIG. 1. Differences in source and sink current in the input stage 102 and in the output stage 104 occur due to process variations in strength of different transistor devices. The '0' or '1' value of the output bit thus varies among different instantiations of the circuit on different circuit die. The input stage 102 generates bias voltages in the PFET unit 106 and the NFET unit 108 which are stacked on one another. The voltage at the center node of the stack varies around $V_{dd}/2$ (half the supply voltage) depending on the strengths of the devices in the stack. This voltage is used to bias devices in the NFET unit 108. If the source and sink currents are different due to process variations between the devices in the input stage 102 and output stage 104, then a voltage other than $V_{dd}/2$ results at the output node which is further amplified by the inverter chain.

FIG. 2 depicts another variety of conventional bit generating cell 200. The RESET signal transitions from 0 to 1 to inject falling edges at the output of the NAND gates 202. These two edges chase each other around the loops 204, 206 and continue circulating if all the delays are identical. However, due to process variation in the NAND gates 202 and the delay elements 208, 210, the delays vary and one of the edges traverses the loops faster catches up to the second edge. The output of the bit generating cell 200 settles to either VoutA='1' and VoutB='0' or vice versa.

One type of circuit that utilizes bit generating cells is an unclonable cell array. Physically unclonable bit generating cells are utilized in such circuits for example used to generate keys for security purposes in data processing systems and devices. Unclonable bit generating cells comprise the same circuit elements and layout, but generate different values (e.g., "1" or "0") depending on manufacturing process variations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
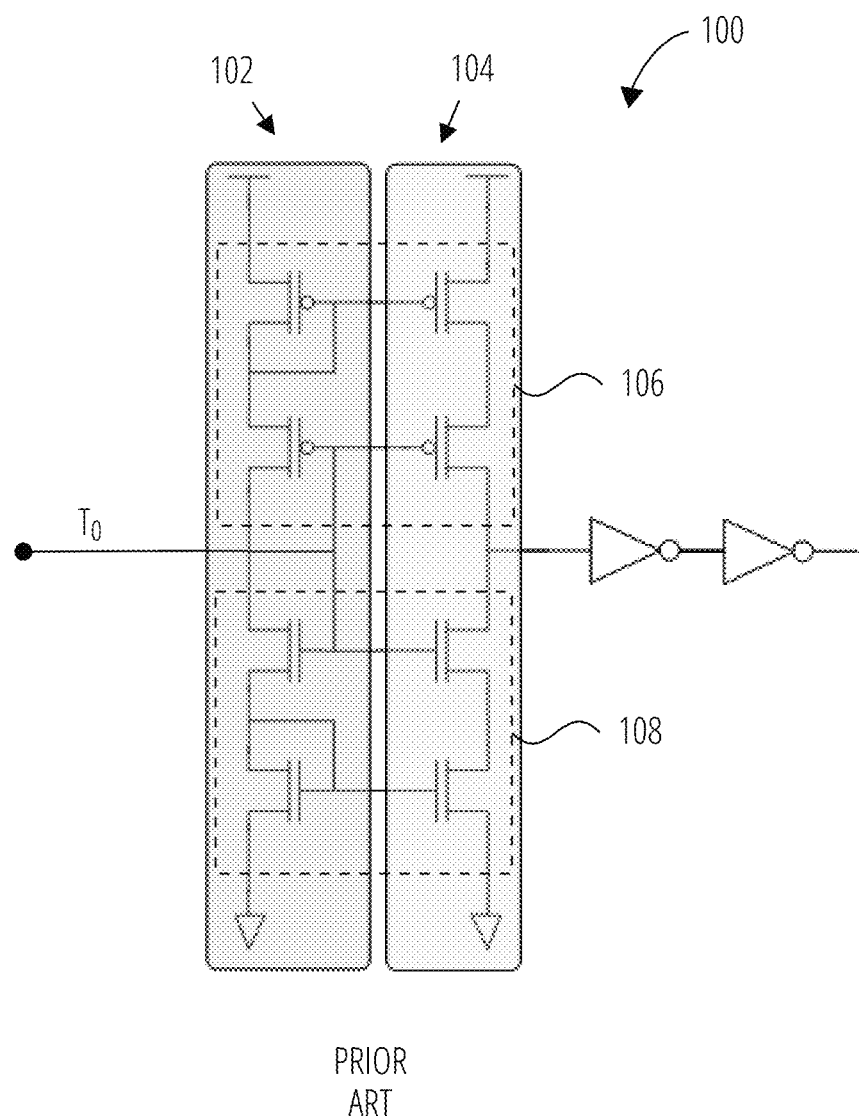
FIG. 1 depicts a conventional bit generating cell 100.
Figure 2:
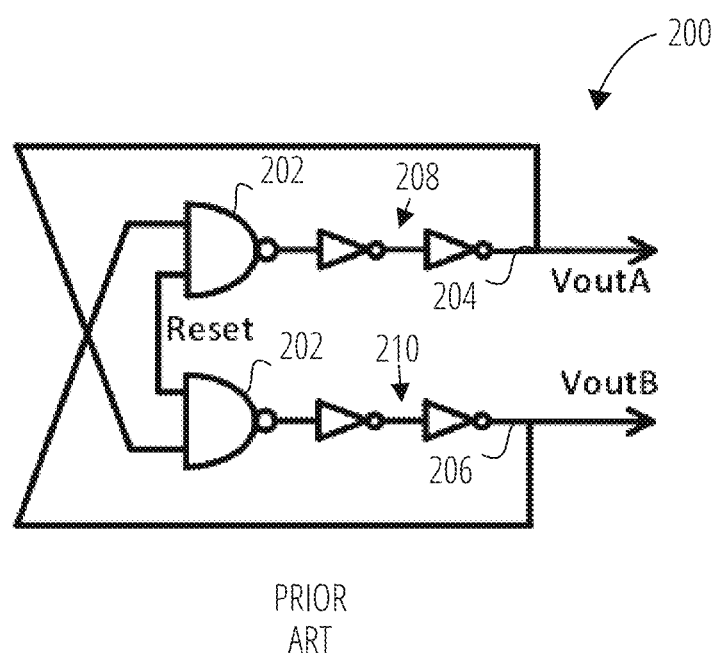
FIG. 2 depicts another type of conventional bit generating cell 200.

In one aspect, a circuit includes one or more bit generating cells, one or more adjustable current sources coupled to introduce perturbations into outputs of the bit generating cells, and logic to select and apply, based on the perturbations, the outputs of a subset less than all of the bit generating cells as a control. The circuit may include an unclonable cell array. The perturbations may be introduced with current mirrors to one or both of NFET units and PFET units of the bit generating cells. The perturbations may be variations to a transition voltage trigger value or may be signal delay perturbations, for example. The unclonable cell array may be configured to generate an encryption key or to authenticate software. In some cases the perturbations may be introduced to only the NFET units, and in other cases the perturbations may be introduced to only the PFET units. When current mirrors are utilized, at least some of the current mirrors are adjustable current mirror. However in such circuits at least some of the current mirrors may also be fixed current mirror. Other technical features may be readily apparent to one skilled in the art from the following figures, descriptions, and claims.

In another aspect, an encryption key generating circuit includes an unclonable cell array, logic to vary an input current to a set of bit generating cells in the unclonable cell array, and logic to configure a subset of the bit generating cells to generate the encryption key based on results of varying the current. The logic to vary the input current may include one or more adjustable current mirror or one or more adjustable delay element, for example. The encryption key generating circuit may be configured to vary the input current of at least some cells of the unclonable cell array independently of one another, and/or may share the logic to vary the input current among a plurality of cells of the unclonable cell array. The logic to vary the input current may include an adjustable PFET current mirror and an adjustable NFET current mirror. Other technical features may be readily apparent to one skilled in the art from the following figures, descriptions, and claims. Other technical features may be readily apparent to one skilled in the art from the following figures, descriptions, and claims.

In yet another aspect, a method includes operating a plurality of current sources to introduce perturbations into outputs of a plurality of bit generating cells, and selecting a subset less than all of the bit generating cells as a key value based a range of the perturbations in each of the bit generating cells. The bit generating cells may be arranged into an unclonable cell array. The key value may be applied as a master key to authenticate a software application, and/or to perform encryption, for example. Other technical features may be readily apparent to one skilled in the art from the following figures, descriptions, and claims.

To more clearly articulate the description of exemplary embodiments, the following terms are introduced.

An adjustable current mirror is a circuit configured such that the amount of current that is mirrored on different branches of a current mirror may be adjusted with a control signal.

A bit generating cell is any circuit that generates an output valued at binary "1" or "0".

A current mirror is any of a variety of circuit topologies that generates substantially identical current in different branches of the circuit.

A fixed current mirror is a current mirror that is not adjustable.

An NFET unit is the sub-cell of a bit generating cell comprising NFET transistors.

A PFET unit is the sub-cell of a bit generating cell comprising PFET transistors.

The transition voltage trigger value is the level of an input signal to a bit generating cell that results in a "1" to "0" transition of the output value, or vice versa.

An unclonable cell array is a collection of bit generating cells that utilize manufacturing process variations to generate output values that differ from those of other unclonable cell arrays having the same circuit structure and components, but that were manufactured on a different die. Changes in operating conditions such as temperature, voltage, and aging of the die may result in different values generated by the unclonable cell array at different instance in time.

In one aspect, a circuit includes a plurality of bit generating cells. The circuit also includes at least one characterization circuit coupled to influence outputs of the bit generating cells, the characterization circuit including a first inverter, a second inverter, and at least one pass-gate circuit coupled between the first inverter and the second inverter. The circuit includes logic to select and apply, based on varying an input and a bias of the first inverter, the outputs of a subset less than all of the bit generating cells.

At least one of the bit generating cells may include a plurality of stages, each stage having more inverters arranged in parallel than an immediately preceding stage (higher fanout).

A digitally-controlled resistance may be formed by arranging a plurality of pass-gate circuits in parallel branches, where an input pass-gate of each branch is responsive to a bit of a control code. Other technical features may be readily apparent to one skilled in the art from the following figures, descriptions, and claims.

In another aspect, a method to select particular cells of an unclonable cell array for use in generating an encryption key, authentication value, or other control includes operating at least one characterization circuit to introduce changes to outputs of a plurality of bit generating cells, and selecting a subset less than all of the bit generating cells to generate the key, value, or control, based a range of the output changes.

Figure 3:
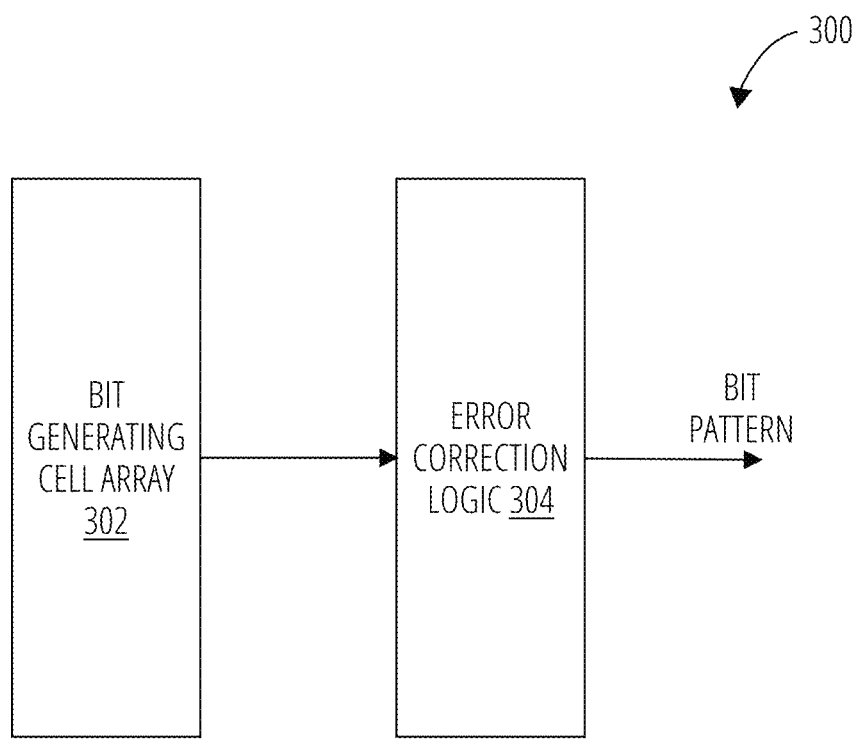
FIG. 3 depicts an unclonable bit pattern generator 300 in accordance with one embodiment.

FIG. 3 depicts an unclonable bit pattern generator 300 in one embodiment. The unclonable bit pattern generator 300 generates a bit pattern by utilizing a bit generating cell array 302 follow by error correction logic 304. The bit pattern may be applied for many purposes, including as a key for digital authentication and/or encryption. One challenge associated with the use of unclonable bit pattern generator 300 is that the output values of individual bit generating cells may vary over time under different operating conditions such as temperature, supply voltage and circuit aging. To remedy this problem, the bit generating cell array 302 output may feed into the error correction logic 304 to compensate for the unstable nature of some cells. As the number of unstable cells increases the complexity of the error correction logic 304 increases. By detecting unstable cells and reducing the percentage of unstable cells in operation over time the error correction logic 304 may be substantially simplified, improving performance, improving reliability, reducing circuit area, and potentially reducing cost.

Figure 4:
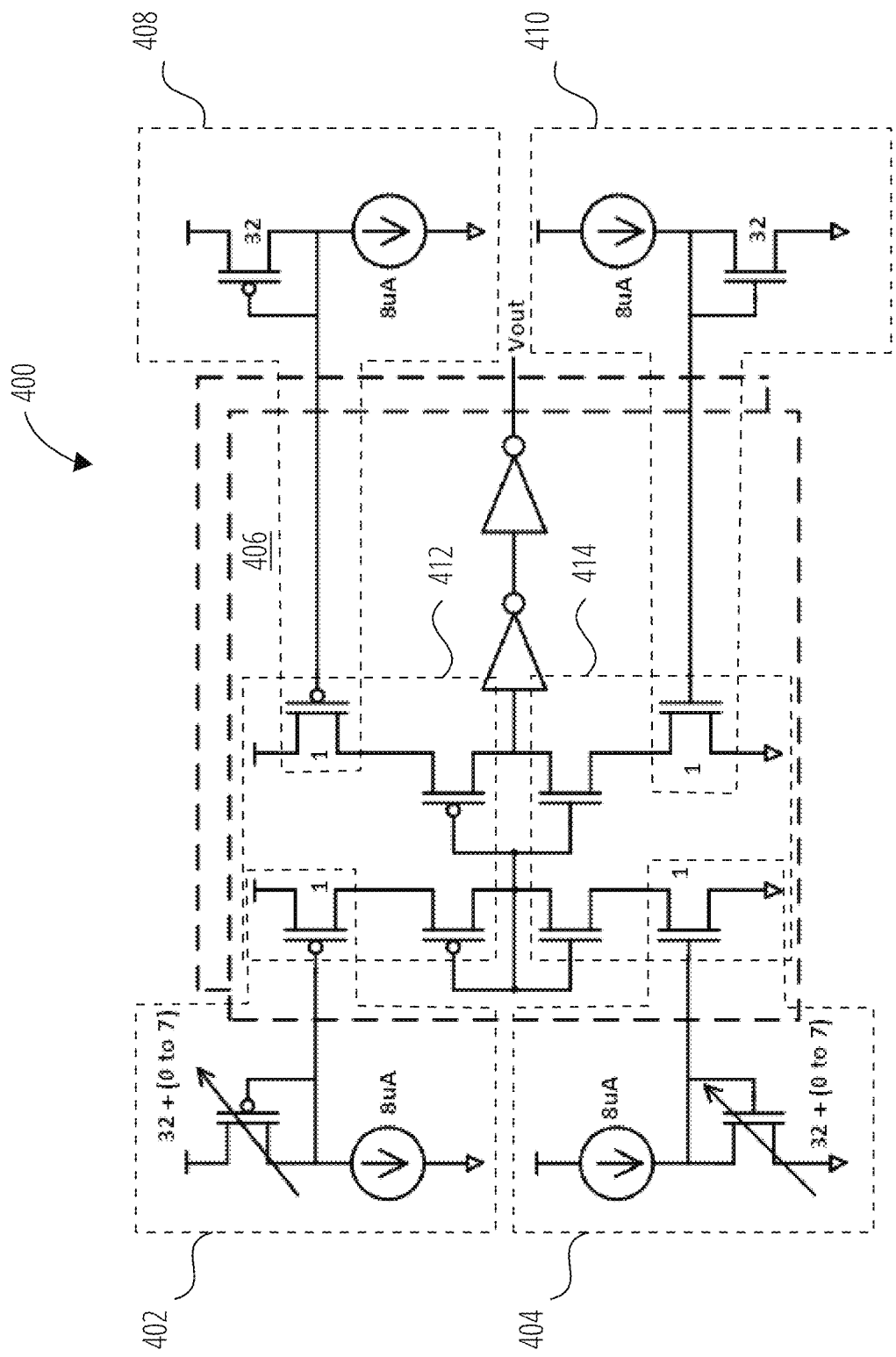
FIG. 4 depicts a tunable current mirror cell 400 in accordance with one embodiment.

FIG. 4 depicts a tunable current mirror cell 400 that may be utilized in the bit generating cell array 302 in one embodiment. The tunable current mirror cell 400 utilizes adjustable current mirrors 402, 404 on input stage transistors of the bit generating cell 406, and fixed current mirrors 408, 410 on output stage transistors of the bit generating cell 406. PFET-type current mirrors are applied to the PFET unit 412 of the bit generating cell 406, and NFET-type current mirrors are applied to the NFET unit 414 of the bit generating cell 406. In another embodiment, current mirrors 402, 404 are fixed current mirrors, and current mirrors 406, 408 are adjustable current mirrors. The description can be readily understood in regards to either embodiment.

In one embodiment, during normal operation (not detection mode), the size of the current mirrors may be set to a ratio of n:1, for example 32:1. When operated in detection mode, the fixed current mirrors 408, 410 are maintained at a ratio of n:1. The ratio of the adjustable current mirror 402 is first changed to (n+k):1 (e.g., with k variable from 0 to 7 using a three bit control code, although k can generally vary between over any practical range and correspond to any practical current step increment), while maintaining the ratio of the adjustable current mirror 404 at n:1, shifting the transition voltage downwards. The output voltage of the bit generating cell 406 is recorded for this setting. The same operation is repeated with roles of the adjustable current mirror 402 and adjustable current mirror 404 switched, shifting the transition voltage upwards. Again, the output of the bit generating cell 406 is recorded. The two recorded outputs are compared to generate a map of bit generating cells that have different values during the two measurements. These represent the cells that are less stable.

In somewhat more sophisticated embodiments, the actual width of the transition voltage windows may be recorded, rather than or in addition to the output values, providing a more detailed characterization of stability and robustness of the stability of individual cells.

In one embodiment, the detection process may be carried out once or periodically and identifications of the unstable cells may be stored in a non-volatile memory. Alternatively, the detection process may be carried out every time the bit pattern (e.g., key) is needed.

The width of the transition window (corresponding to ranges of the code values to the adjustable current mirrors) that thresholds what is considered an unstable cell may be configurable. Wider windows may result in more stable cells being characterized as unstable, whereas narrower windows may result in some unstable cells escaping detection.

In one embodiment, potentially unstable bit generating cells are detected by varying the midpoint voltage or transition voltage of one of the branches of the PFET unit/NFET unit stack, to identify cells in which the transition voltage trigger values of the different branches are close in value (i.e., within some configured tolerance of separation).

Figure 5B:
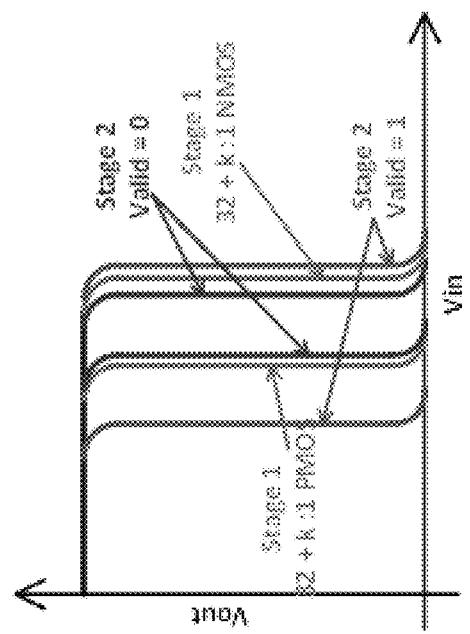
FIG. 5B depicts the signal behavior of the tunable current mirror cell 400 in additional aspects.
Figure 5A:
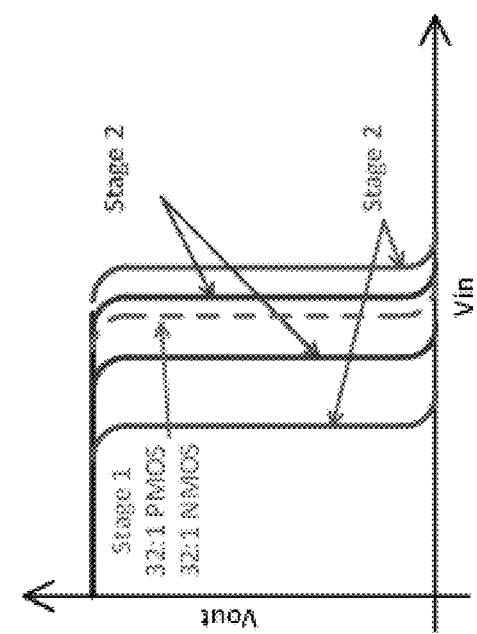
FIG. 5A depicts signal behavior for the tunable current mirror cell 400 in accordance with one embodiment.

In FIG. 5A, the transition voltage of the input stage 102 for a configured default setting of input current is depicted by the green dotted line. The transition voltage of the output stage 104 may be any one of the four other solid curves. The current to the input stage 102 is varied so that the transition voltage of the input stage 102 is both less than and more than for the default setting (FIG. 5B), creating a window around the default transition point. The unstable cells may be detected by examining the output value of the bit generating cell. Cells with output values that flip for small changes (i.e., a configured range) of the transition voltage trigger value are the ones that have a tendency to become unstable with operational process variations (lighter gray curves). The bit generating cells with output voltages that do not flip value within this window of change are the cells that may be consider stable (darker transition voltage curves) and therefore selected and applied to generate bit patterns such as authentication and/or encryption keys.

Figure 6:
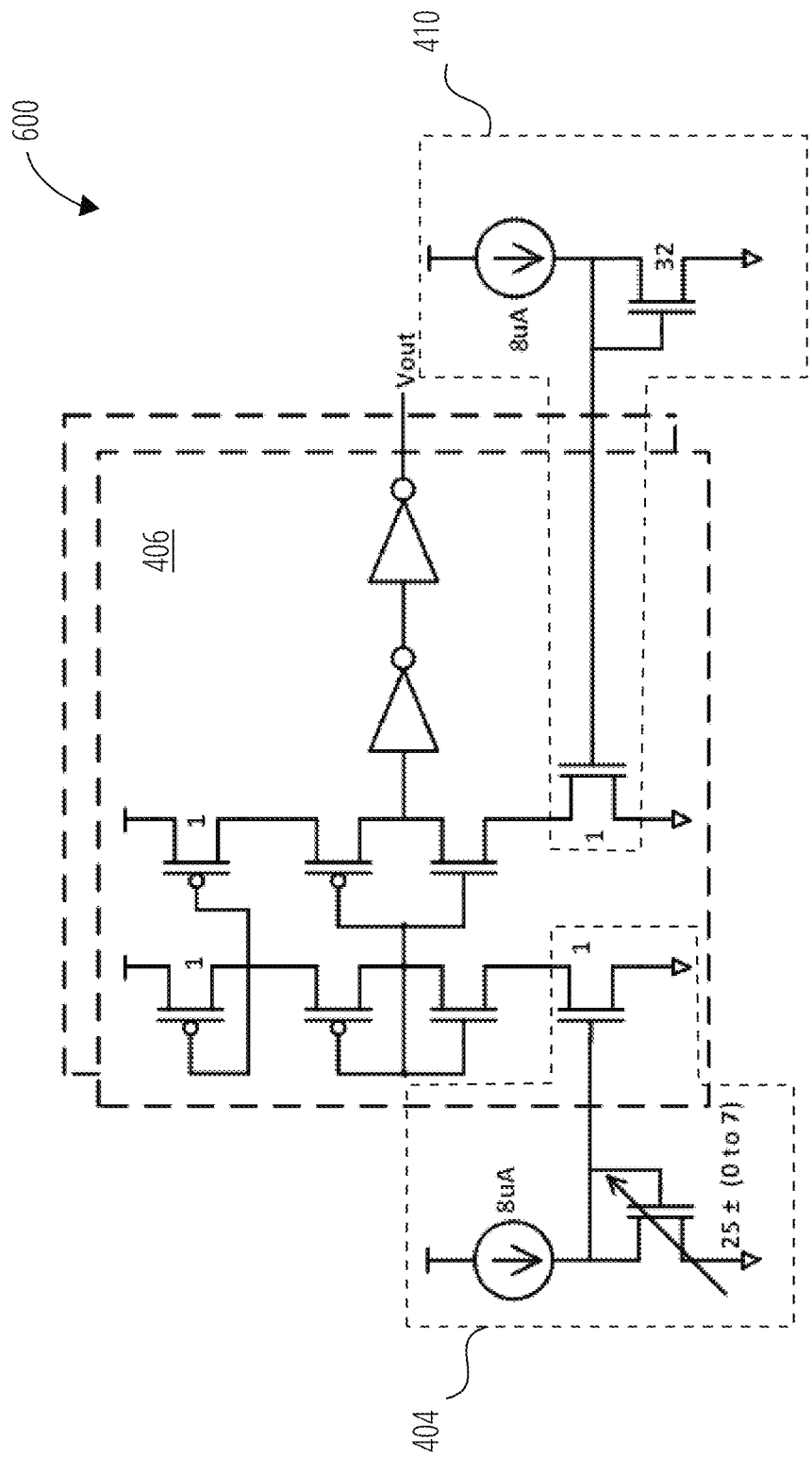
FIG. 6 depicts a tunable current mirror cell 600 in accordance with another embodiment.

FIG. 6 depicts another embodiment of a tunable current mirror cell 600 in which current mirrors 404, 410 are applied only to the NFET unit 414 of the bit generating cell 406. Likewise, yet another embodiment may apply current mirrors (e.g., 402, 408) to only the PFET unit 412 of the bit generating cell 406. This embodiment utilizes only two current mirrors to the bit generating cell 406. This may simplify circuit routing and reduce circuit area/power consumption.

Figure 7:
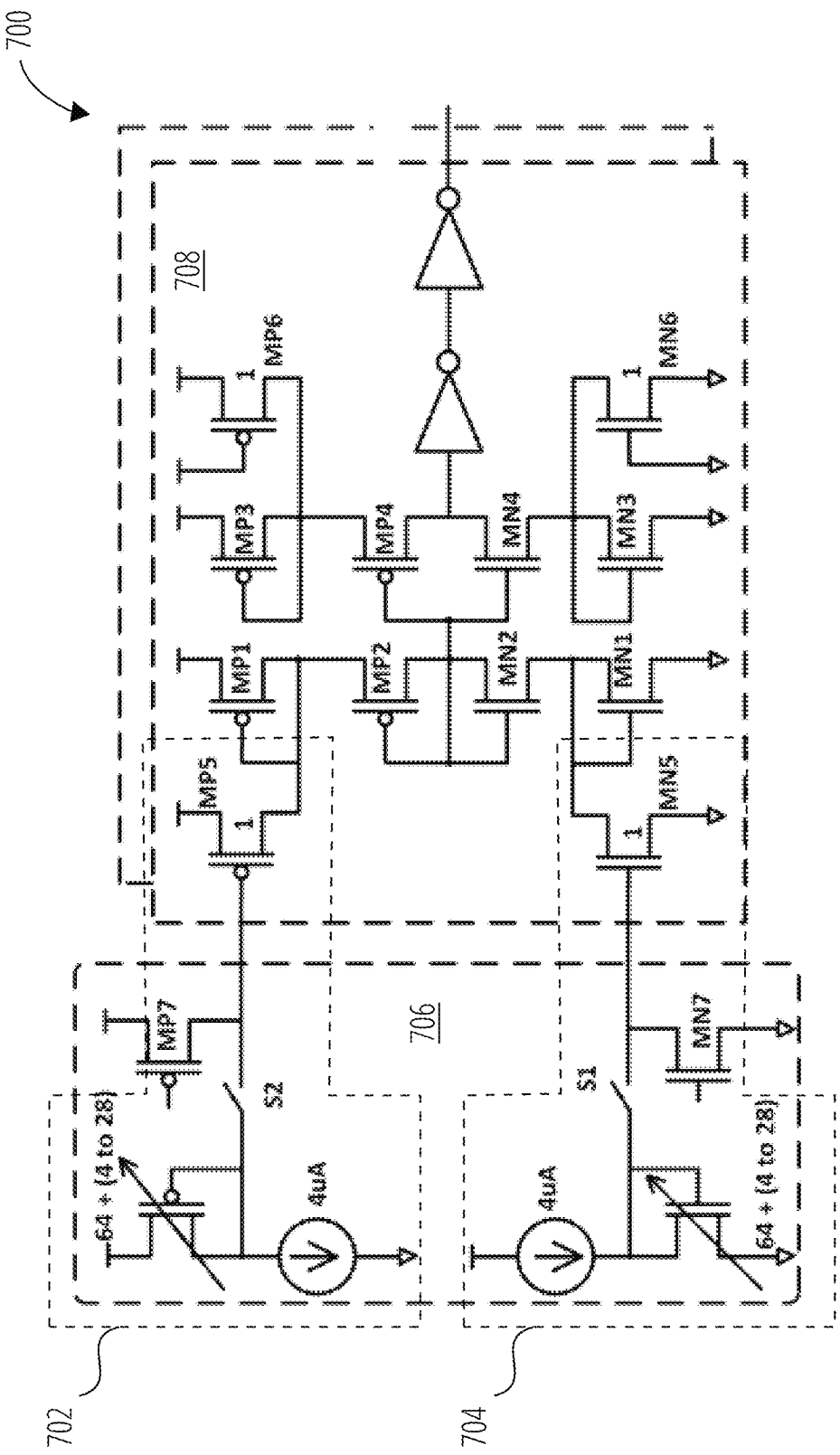
FIG. 7 a tunable current mirror cell 700 in accordance with yet another embodiment.

FIG. 7 depicts a tunable current mirror cell 700 in one embodiment in which adjustable current mirrors 702, 704 of a current source 706 are applied only to transistors of the input stage of the bit generating cell 708. Fixed current mirrors on the output stage are not utilized in this embodiment.

In the tunable current mirror cell 700, the adjustable current mirrors 702, 704 are coupled in parallel with the self-biased current sources (MN1, MN3, MP1, MP3). The adjustable current mirror 702 and adjustable current mirror 704 comprise transistors MN5 and MP5 whose gate-source voltage $V_{gs}$ is controllable. The transistors MN6 and MP6 are dummy transistors for matching purposes to MN5 and MN6, respectively, and are always turned OFF.

During the detection process either of the switch S1 or S2 is closed and the corresponding pull-down or pull-up transistor MN7 or MP7 is turned OFF. The mirroring ratio of the corresponding adjustable current source is adjusted to the configured window width as described previously. This process is performed sequentially once for the NMOS unit and then again for the PMOS unit. Cells exhibiting an output flip are noted as unstable.

During normal operation, the switches S1 and S2 are both open and the adjustable current sources 702, 704 are isolated from the 708. The pull-up and pull-down transistors (MP7 and MN7) are both turned ON to set the $V_{gs}$ of MN5 and MP5 to (ideally) 0V.

This implementation utilizes only two adjustable current sources. Additionally, during normal operation there is no input from the current sources which helps ensure that any bias in the current source does not influence the bit generating cell 708 output during normal operation.

Figure 8:
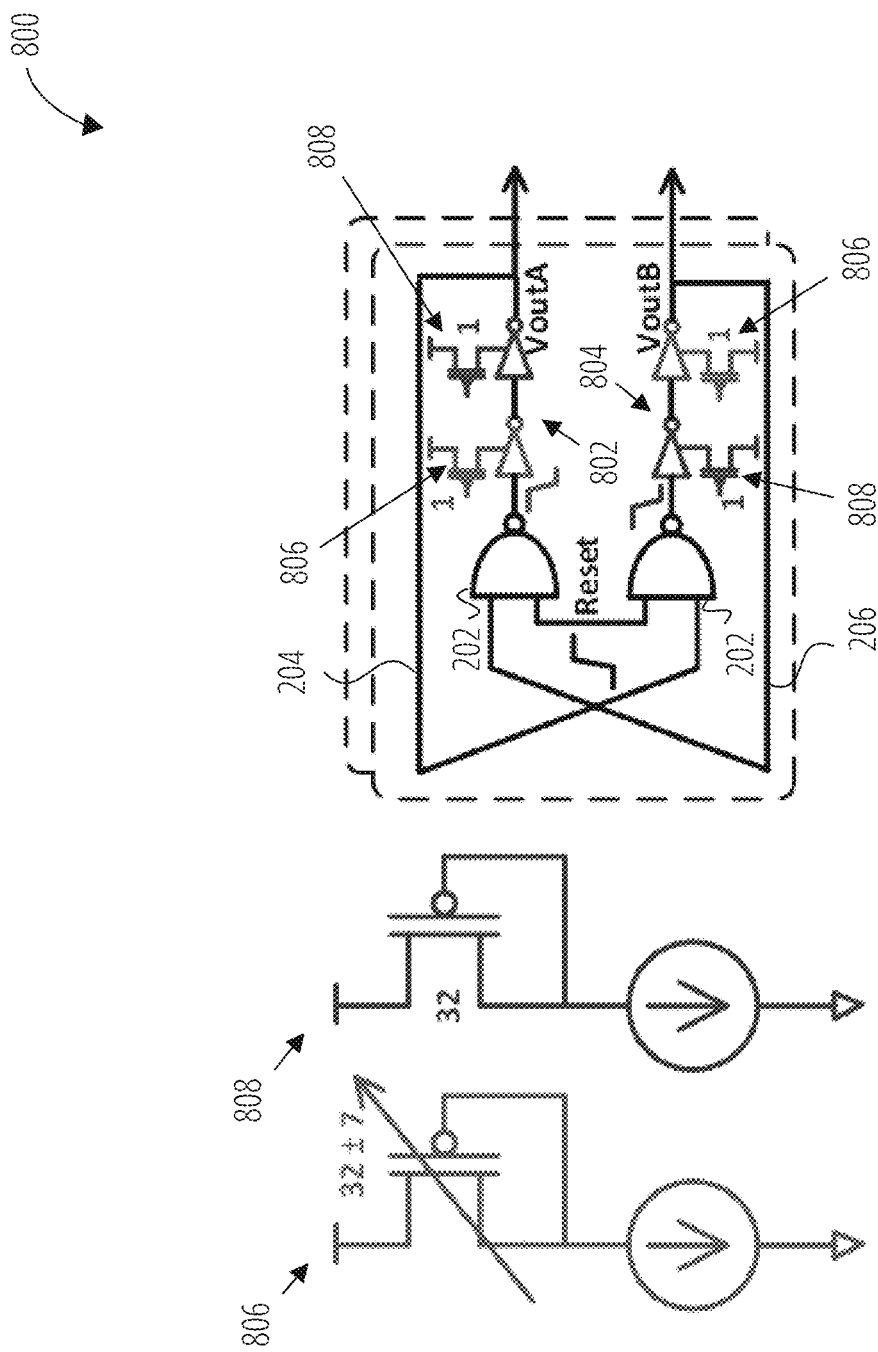
FIG. 8 depicts a tunable edge chasing cell 800 in accordance with one embodiment.

FIG. 8 depicts a tunable edge chasing cell 800 in one embodiment. The tunable edge chasing cell 800 may typically include an even number of delay elements on each loop 204, 206. One or more of the delay elements 802, 804 on each loop is coupled to an adjustable current sources 806, enabling the delay introduced by those elements into the loops to be tuned (adjusted up or down). Delay elements that are not coupled to an adjustable current source 806 may be coupled to fixed current sources 808 to hold their delay constant.

Figure 9A:
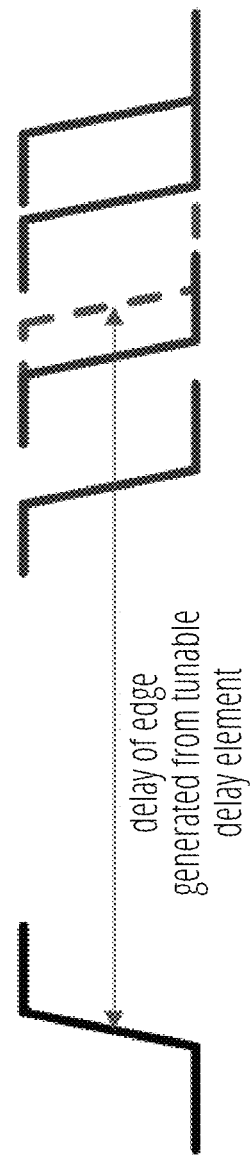
FIG. 9A depicts signal behavior of the tunable edge chasing cell 800 in accordance with one embodiment.
Figure 9B:
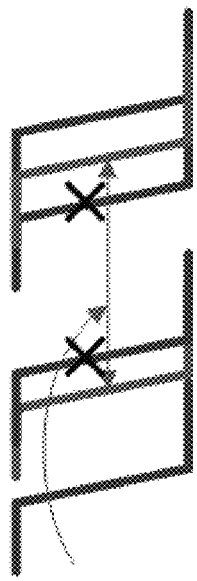
FIG. 9B depicts signal behavior of the tunable edge chasing cell 800 in additional aspects.

Adjustable current sources are coupled to certain ones of the delay elements in one or more of the loops of the tunable edge chasing cell 800. Different delay elements impact the timing of different edges, which can be controlled using the current sources. The timing of the edge depicted by the dotted line (FIG. 9A), for example, may be controlled to lag or follow the edge marked with an "X" as depicted in FIG. 9B. The detection of unstable cells follows the process described previously, with one difference. Instead of varying the internal transition voltage of the bit generating cell, the delay of delay elements (e.g., current-starved inverter cells) is varied. The delay of some delay elements may be held constant (with constant current sources) whereas one or more other delays are varied, to create a delay window around a configured default value. The cells selected for application are those whose output values do not flip even when the delay of the edge(s) is varied across a sufficiently wide configured range of values.

Figure 10A:
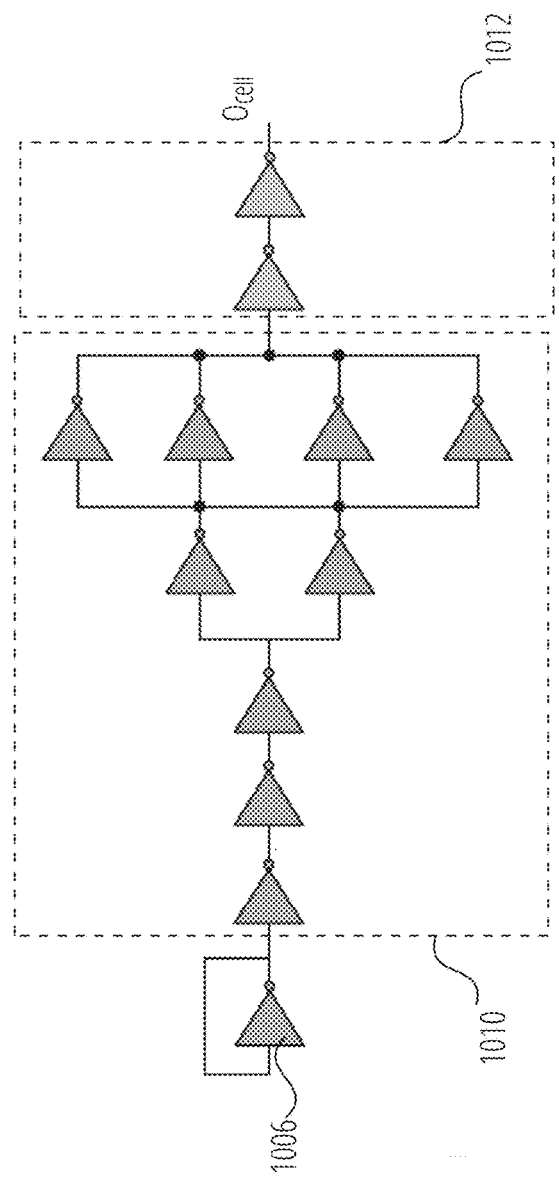
FIG. 10A depicts a bit generating cell in accordance with one embodiment.

FIG. 10A depicts an embodiment of a cell for use in an unclonable cell array. The cell is constructed from a series-parallel arrangement of inverters. To characterize the cell as suitable for use in the unclonable cell array or not, the circuit in FIG. 10B may be utilized.

Figure 10B:
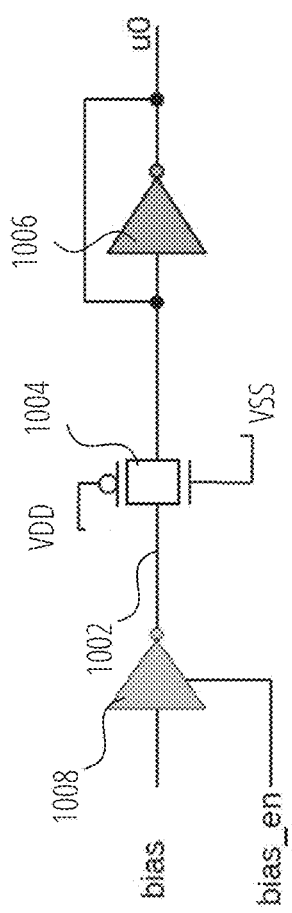
FIG. 10B depicts a characterization circuit in accordance with one embodiment.

Referring to FIG. 10B, asserting bias_en enables the bias signal to influence the output of the tri-state inverter 1008. When bias_en is asserted, the tri-state inverter 1008 inverts the bias signal voltage onto the circuit node 1002. Otherwise, when bias_en is not asserted, the circuit node 1002 is not driven by the tri-state inverter 1008 and has an indeterminate voltage. The pass-gate 1004 is always "off" and acts as a resistance between the circuit node 1002 and the inverter 1006. The resistance provided by the pass-gate 1004 may be configured by selecting the sizes of the transistors that the pass-gate 1004 comprises, in manners well-understood in the art.

Although a single pass-gate 1004 is depicted in FIG. 10B, multiple pass-gates may be utilized in series, in parallel, or combinations thereof, to achieve a desired resistance via a digital control signal. A circuit embodiment that enables such binary control the resistance is depicted in FIG. 11.

Figure 11:
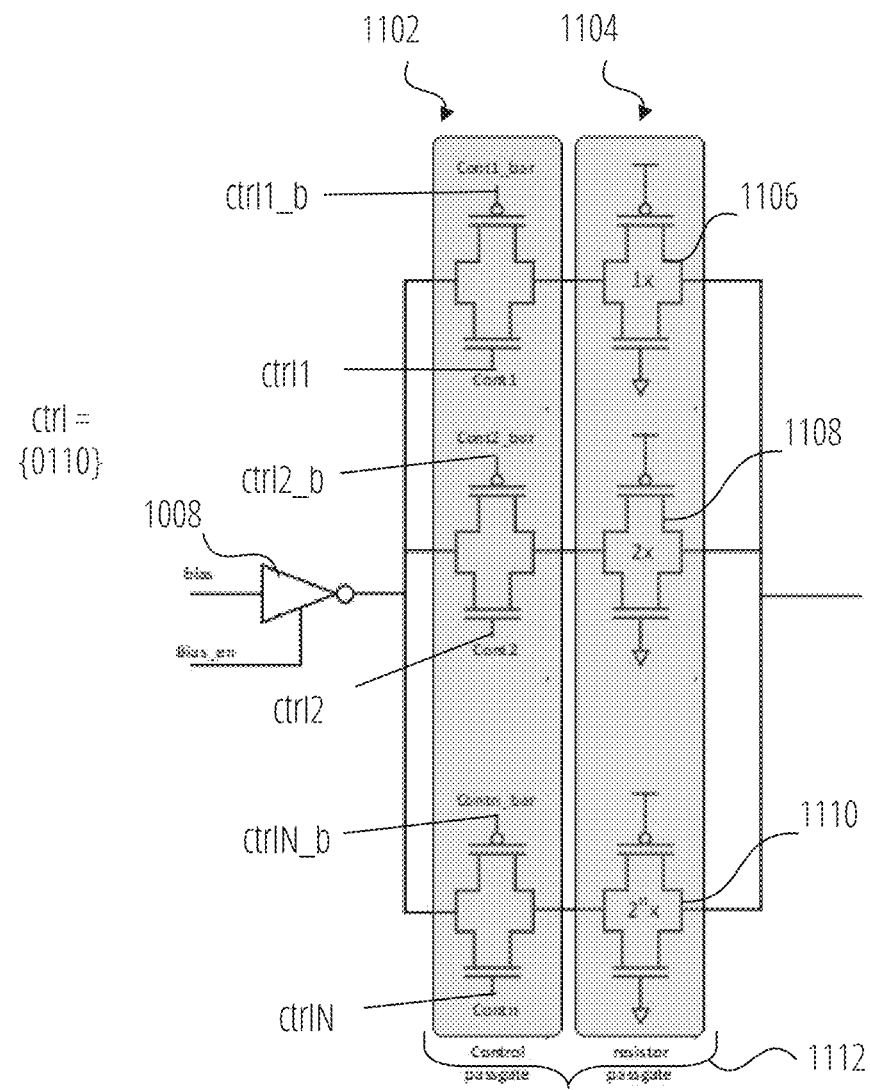
FIG. 11 depicts a digitally-controlled resistance in accordance with one embodiment.

Referring to FIG. 11, the digital value ctrl determines which branches of the adjustable resistance 1112 structure are activated, and hence the overall resistance provided by the adjustable resistance 1112 between circuit node 1002 and inverter 1006. An advantage of the adjustable resistance 1112 structure in particular is that it provides relatively high resistance values, e.g., in the range of hundreds of kilo-ohms to megaohms. In effect, the adjustable resistance 1112 functions as a digital-to-analog converter that also provides a controllable, high circuit impedance. The digitally-controlled resistance is set by applying a control code to the controlled pass-gates 1102 to resistively add the fixed resistance pass-gates 1104 one or more branches of the parallel structure of pass-gate circuits to the end-to-end resistance of the adjustable resistance 1112. In one embodiment, the resistance in each branch of the adjustable resistance 1112 may be a power of two of a unit resistance value—for example, one branch may comprise a 1X unit resistance 1106, another a 2X unit resistance 1108, and so on, up to a $2^N$X unit resistance 1110. However, the variation in resistance across branches need not follow a power of two scale.

In one embodiment the control code (ctrl) is scanned through different values, e.g., for a four-bit code, from a value of 0 (binary 0000) to a maximum value of 15 (binary 1111), introducing progressively less instability into the outputs of the cells of the unclonable cell array.

The inverter 1006 has its input coupled to its output, so that the output of the inverter 1006 stabilizes at a voltage somewhere between VDD (power rail voltage) and VSS (ground rail voltage). The actual value of the voltage at the output of inverter 1006 depends on the value of the resistance of pass-gate 1004, or more generally of the value of the adjustable resistance 1112 when the adjustable resistance 1112 is used in place of the single pass-gate 1004. Thus the value of the control signal (ctrl) may determine the output voltage of the inverter 1006.

During normal operation (meaning, not during characterization of the cell), bias_en is not asserted, and where the adjustable resistance 1112 is used, ctrl is set to turn off all of the controlled pass-gates 1102.

Figure 12:
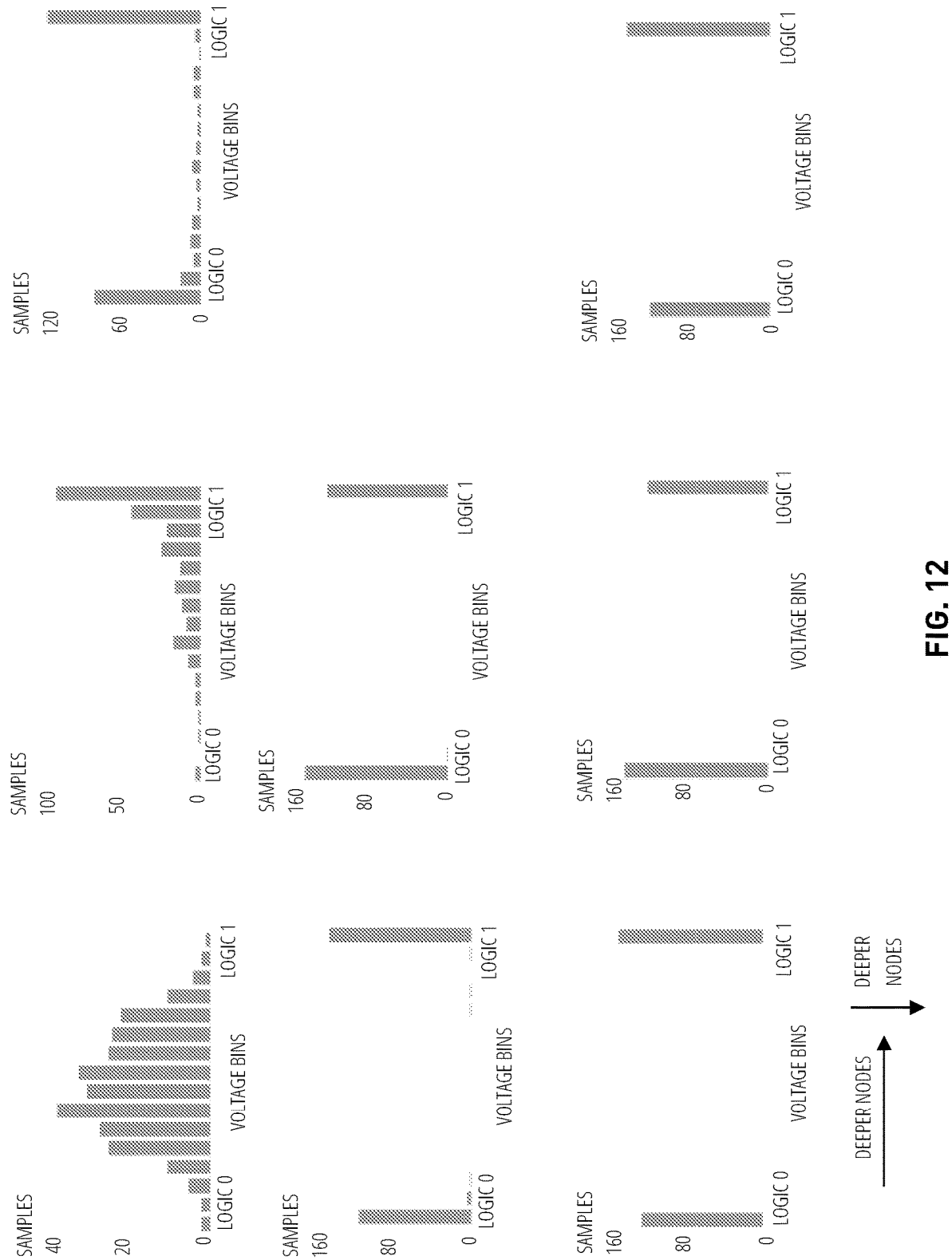
FIG. 12 depicts an example of binary resolution in a multi-stage bit generating cell.

During characterization of the cell using the adjustable resistance 1112, bias is set to a first binary value (e.g., 0). The system sets a value of the control code ctrl to the controlled pass-gates 1102, causing the adjustable resistance 1112 to take on one of a series of possible discrete resistance values. The value of bias is then flipped to the opposite binary value (e.g., to 1 if it was initially set to 0). This process is repeated for different values of the control code ctrl. For each value of the control code ctrl, the binary-ization stages 1010 coerce the distribution of output $O_{cell}$ toward either a binary 1 or a binary 0, for example as depicted in FIG. 12 which shows the voltage distribution at progressively deeper nodes in the cell during operation, once the cells are characterized. In characterization mode, external stimuli are applied to determine if/when cells flip their outputs, using for example the structure depicted in FIG. 10B. The amount of stimuli is controlled for example using the structure depicted in FIG. 11.

Figure 13A:
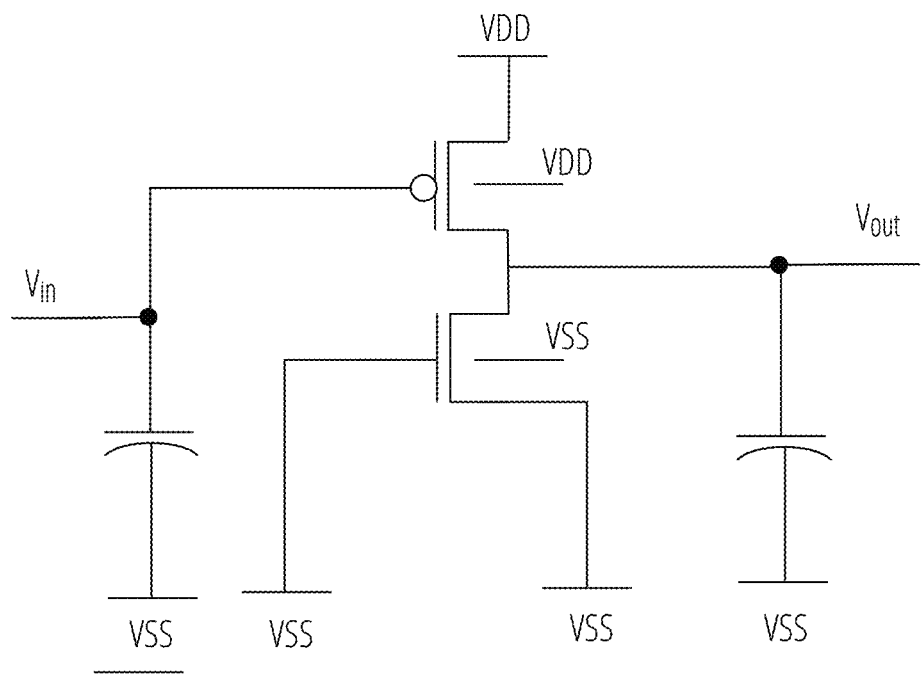
FIG. 13A-FIG. 13C depict inverter structures in accordance with various embodiments.
Figure 13B:
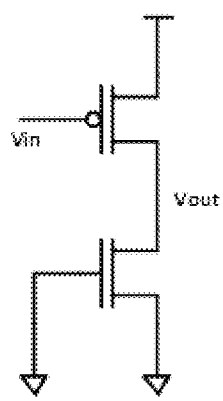
Figure 13C:
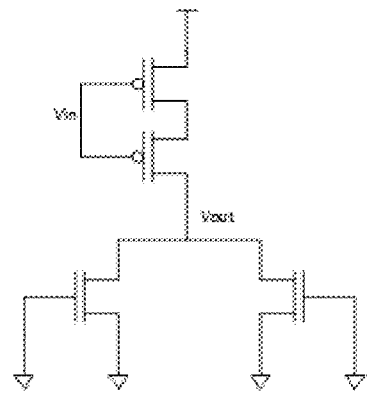

The binary-ization stages 1010 may utilize a particular inverter structure depicted in FIG. 13A, where VDD is a power rail voltage (binary 1) and VSS is a ground rail voltage (binary 0). The inverter 1006 may also utilize this particular structure. More generally, any inverter design that provides for an adjustable trip point (e.g., via transistor or bias settings) may be utilized. The particular structure in FIG. 13A has this characteristic and also consumes low power compared to other inverter designs. FIG. 13B and FIG. 13C depict structures that may be utilized in alternate embodiments.

One difference between these designs and conventional inverters is that the NMOS gate is grounded so that leakage voltage/current determines the bias point. Multiple NMOS devices may be utilized in parallel to obtain sufficient leakage to set the bias at the desired point. To reduce the strength of the PMOS device, multiple such devices may be connected in series.

Those of ordinary skill in the art will recognize that the CMOS gates depicted herein could be built "upside down" such that the PMOS is turned OFF by connecting its gate to VDD and the NMOS gate is the input. Those of ordinary skill in the art will also recognize that in the binary-ization stages 1010, the number of serial inverters and/or the number of fan-out stages, and degree of fan-out (number of inverters in parallel) are design choices based on how the (inverter) trip points of the stages are to be distributed, vs tradeoff in area and power consumption. More and higher fan-out stages will tend to resolve the final output more reliably and accurately than fewer stages, at the cost of increased circuit area.

The tri-state inverter 1008 and the output stage inverters 1012 may utilize a conventional tri-state inverter structure.

If (on condition that), for a given value of ctrl configured as a threshold, flipping the bias signal from 0 to 1 causes the output $O_{cell}$ to flip values, then the cell may be characterized as unstable and not utilized in an unclonable cell array to generate control values (e.g., an encryption key or authentication value). For a configured range of values for ctrl, it may be acceptable that the output value of a cell flips when bias is flipped, and for other values of ctrl the system may be configured to treat the cell as unstable if flipping ctrl flips $O_{cell}$. Cells that flip for higher resistance values set by ctrl have weakly determined outputs and may be deselected for use with generating control bits.

Although the examples herein are given in terms of characterizing the cells of unclonable cell arrays, the techniques are more generally applied to characterizing the stability of any digital circuit that may be bi-stable under process, temperature, and voltage variation.

Embodiments of the circuit in FIG. 10B may be utilized to drive an unclonable cell array cell or similar structures as depicted in FIG. 10A. In other embodiments, it may be utilized to drive terminal $T_0$ in an unclonable cell array cell or similar structure as depicted FIG. 1. In yet other embodiments, it may be utilized to introduce variations into the adjustable current sources 806 depicted in an unclonable cell array cell and similar structures of FIG. 8.

Figure 14:
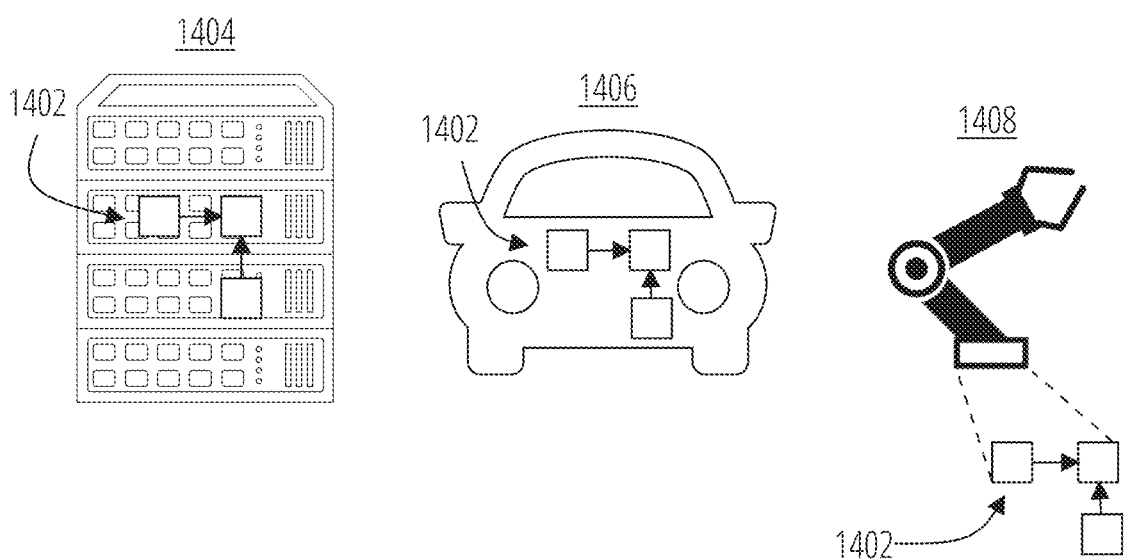
FIG. 14 depicts exemplary commercial applications of an unclonable cell array 1402.

FIG. 14 depicts exemplary scenarios for use of an unclonable cell array 1402 in accordance with some embodiments. An unclonable cell array 1402 may be utilized in a computing system 1404, a vehicle 1406, and a robot 1408, to name just a few examples. The unclonable cell array 1402 may output bit patterns to error correction logic to form authentication and encryption keys, for example. Generally, the unclonable cell array 1402 may be utilized anywhere a bit pattern is needed.

The systems disclosed herein, or particular components thereof, may in some embodiments be utilized in conjunction with software comprising instructions executed on one or more programmable device. By way of example, components of the disclosed systems may be implemented to authenticate and/or authorize use of an application, an app, drivers, or services on particular devices. In one particular embodiment, the system may be implemented as part of an authentication service that executes as one or more processes, modules, subroutines, or tasks on a server device so as to provide the described capabilities to one or more client devices over a network. However the system need not necessarily be accessed over a network and could, in some embodiments, be implemented by one or more app or applications on a single device or distributed between a mobile device and a computer, for example.

Figure 15:
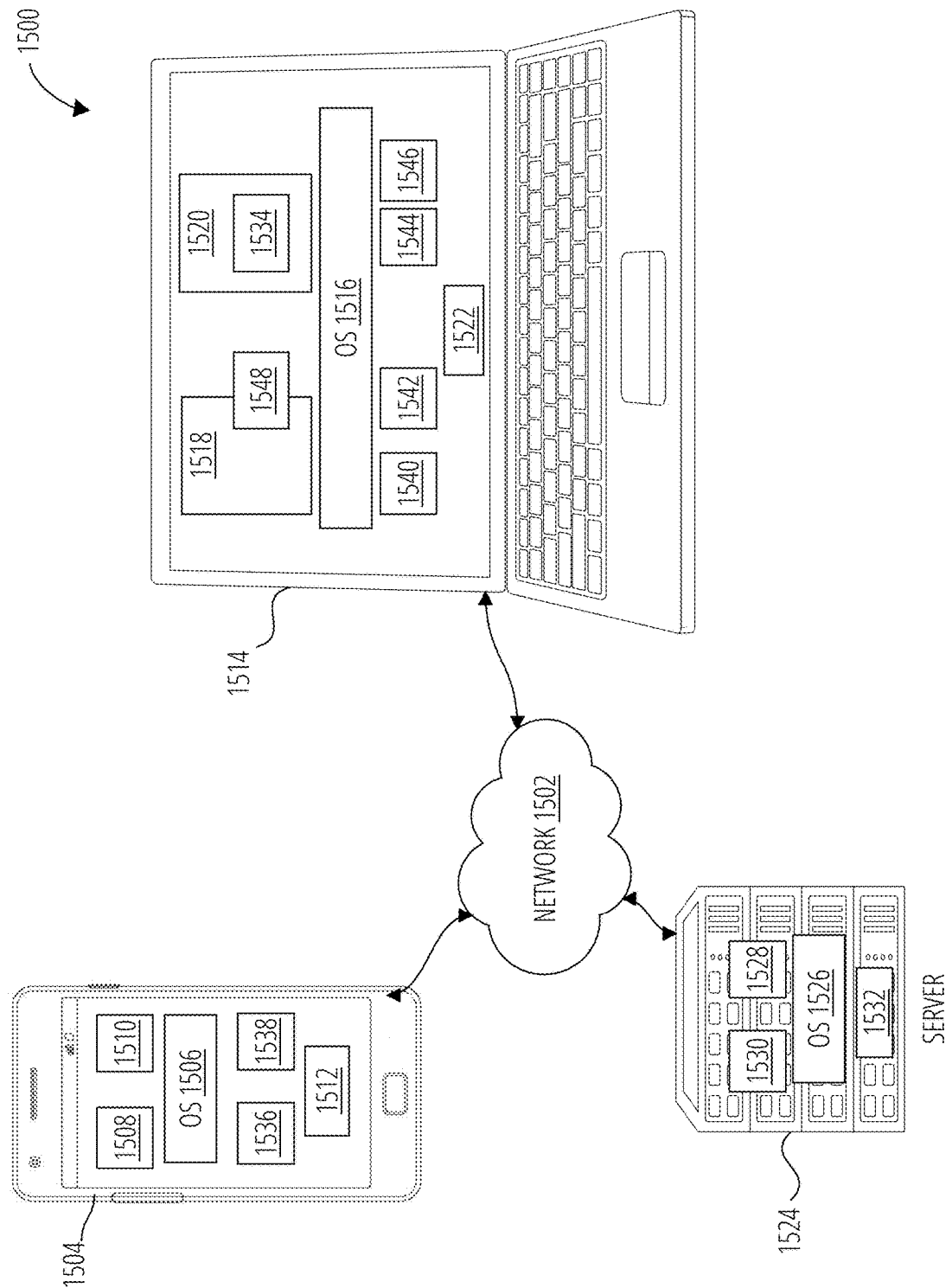
FIG. 15 depicts a computing environment 1500 in accordance with one embodiment.

Referring to FIG. 15, a computing environment 1500 illustrates various computer hardware devices and software modules coupled by a network 1502 in one embodiment. Each device includes a native operating system, typically pre-installed on its non-volatile RAM, and a variety of software applications or apps for performing various functions.

The mobile programmable device 1504 comprises a native operating system 1506 and various apps (e.g., app 1508 and app 1510). The mobile programmable device 1504 also comprises an unclonable bit array 1512. A computer 1514 includes an operating system 1516 that may include one or more library of native routines to run executable software on that device. The computer 1514 also includes various executable applications (e.g., application 1518 and application 1520), and an unclonable bit array 1522. The mobile programmable device 1504 and computer 1514 are configured as clients on the network 1502. A server 1524 is also provided and includes an operating system 1526 with native routines specific to providing a service (e.g., service 1528 and service 1530) available to the networked clients in this configuration. The server 1524 also comprises an unclonable bit array 1532.

In one embodiment, the unclonable bit array 1512 and the unclonable bit array 1522 are utilized to generate key values utilized to authenticate/authorize the mobile programmable device 1504 and computer 1514 to utilize services 1530, 1528 of the server 1524. In some embodiments, the key may also or alternatively be used for encrypted communication between these devices over the network 1502. The unclonable bit array 1532 of the server 1524 may in some embodiments be utilized to similar purpose, and/or to authenticate and/or communicate with other server devices (not depicted).

A compiler is typically used to transform source code into object code and thereafter a linker combines object code files into an executable application, recognized by those skilled in the art as an "executable". The distinct file comprising the executable would then be available for use by the computer 1514, mobile programmable device 1504, and/or server 1524. Any of these devices may employ a loader to place the executable and any associated library in memory for execution. The operating system executes the program by passing control to the loaded program code, creating a task or process. An alternate means of executing an application or app involves the use of an interpreter (e.g., interpreter 1534).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 1536 or driver 1538 on the mobile programmable device 1504 or computer 1514 (e.g., driver 1540 and driver 1542) might enable wireless headphones to be used for audio output(s) and a camera to be used for video inputs. Any of the devices may read and write data from and to files (e.g., file 1544 or file 1546) and applications or apps may utilize one or more plug-in (e.g., plug-in 1548) to extend their capabilities (e.g., to encode or decode video files).

The network 1502 in the computing environment 1500 can be of a type understood by those skilled in the art, including a Local Area Network (LAN), Wide Area Network (WAN), Transmission Communication Protocol/Internet Protocol (TCP/IP) network, and so forth. These protocols used by the network 1502 dictate the mechanisms by which data is exchanged between devices.

Figure 16:
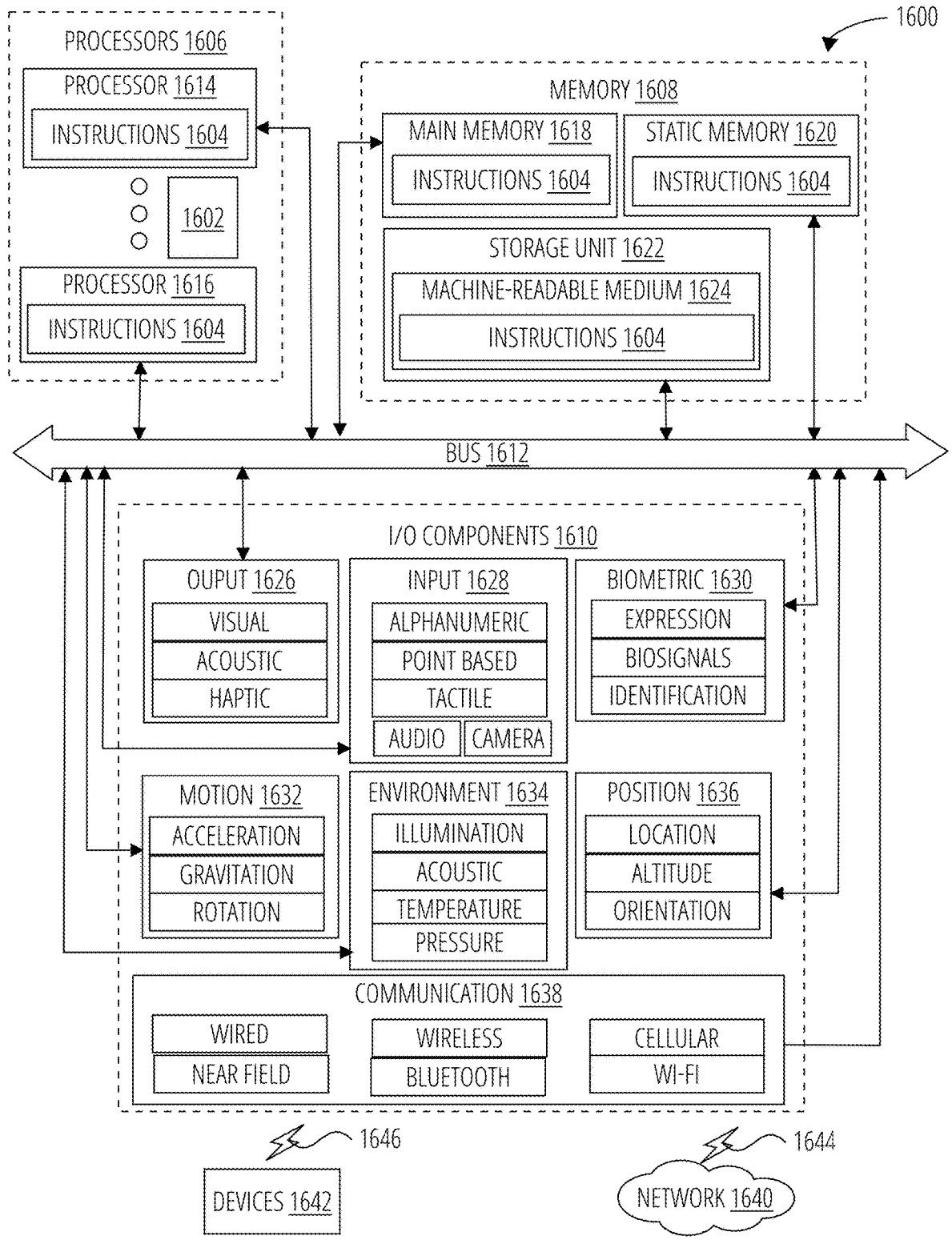
FIG. 16 depict a computer system 1600 in accordance with one embodiment.

FIG. 16 depicts a diagrammatic representation of a computer system 1600 in the form of a computer system comprising one or more bit generating cell array 1602.

Specifically, FIG. 16 depicts a computer system 1600 comprising instructions 1604 (e.g., a program, an application, an applet, an app, or other executable code) for causing the computer system 1600 to perform any one or more of the functions or methods discussed herein. The instructions 1604 configure a general, non-programmed machine into a particular computer system 1600 programmed to carry out said functions and/or methods. The bit generating cell array 1602 may be applied, for example, to generate a key to authenticate or authorize applications, apps, or other executable code to operate on the computer system 1600.

In alternative embodiments, the computer system 1600 operates as a standalone device or may be coupled (e.g., networked) to other machines. In a networked deployment, the computer system 1600 may operate in the capacity of a server machine or a client machine in a server-client network environment, or as a peer machine in a peer-to-peer (or distributed) network environment. The bit generating cell array 1602 may be applied, for example, to generate a key for communication by the computer system 1600 over a network.

The computer system 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1604, sequentially or otherwise, that specify actions to be taken by the computer system 1600. Further, while only a single computer system 1600 is depicted, the term "machine" shall also be taken to include a collection of machines that individually or jointly execute the instructions 1604 to perform any one or more of the methodologies or subsets thereof discussed herein.

The computer system 1600 may include processors 1606, memory 1608, and I/O components 1610, which may be configured to communicate with each other such as via one or more bus 1612. In an example embodiment, the processors 1606 (e.g., a Central Processing Unit (CPU), a Reduced Instruction Set Computing (RISC) processor, a Graphics Processing Unit (GPU), a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1614 and processor 1616) to execute the instructions 1604. The term "processor" is intended to include multi-core processors that may comprise two or more independent processors (sometimes referred to as "cores") that may execute instructions contemporaneously. Although FIG. 16 depicts multiple processors 1606, the computer system 1600 may include a single processor with a single core, a single processor with multiple cores (e.g., a multi-core processor), multiple processors with a single core, multiple processors with multiples cores, or any combination thereof.

Although the bit generating cell array 1602 is depicted as being part of one or more of the processors 1606, in general it may be utilized in any component, such as a motherboard or in one of the I/O components 1610.

The memory 1608 may include one or more of a main memory 1618, a static memory 1620, and a storage unit 1622, each accessible to the processors 1606 such as via the bus 1612. The main memory 1618, the static memory 1620, and storage unit 1622 may be utilized, individually or in combination, to store the instructions 1604 embodying any one or more of the functionality described herein. The instructions 1604 may reside, completely or partially, within the main memory 1618, within the static memory 1620, within a machine-readable medium 1624 within the storage unit 1622, within at least one of the processors 1606 (e.g., within the processor's cache memory), or any suitable combination thereof, during execution thereof by the computer system 1600.

The I/O components 1610 may include a wide variety of components to receive input, provide output, produce output, transmit information, exchange information, capture measurements, and so on. The specific I/O components 1610 that are included in a particular machine will depend on the type of machine. For example, portable machines such as mobile phones will likely include a touch input device or other such input mechanisms, while a headless server machine will likely not include such a touch input device. It will be appreciated that the I/O components 1610 may include many other components that are not shown in FIG. 16. The I/O components 1610 are grouped according to functionality merely for simplifying the following discussion and the grouping is in no way limiting. In various example embodiments, the I/O components 1610 may include output components 1626 and input components 1628. The output components 1626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1610 may include biometric components 1630, motion components 1632, environmental components 1634, or position components 1636, among a wide array of possibilities. For example, the biometric components 1630 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1632 may include acceleration sensor components (e.g., accelerometer), gravitation sensor components, rotation sensor components (e.g., gyroscope), and so forth. The environmental components 1634 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1636 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1610 may include communication components 1638 operable to couple the computer system 1600 to a network 1640 or devices 1642 via a coupling 1644 and a coupling 1646, respectively. For example, the communication components 1638 may include a network interface component or another suitable device to interface with the network 1640. In further examples, the communication components 1638 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1642 may be another machine or any of a wide variety of peripheral devices (e.g., a peripheral device coupled via a USB).

Moreover, the communication components 1638 may detect identifiers or include components operable to detect identifiers. For example, the communication components 1638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1638, such as location via Internet Protocol (IP) geolocation, location via Wi-Fi® signal triangulation, location via detecting an NFC beacon signal that may indicate a particular location, and so forth.

The various memories (i.e., memory 1608, main memory 1618, static memory 1620, and/or memory of the processors 1606) and/or storage unit 1622 may store one or more sets of instructions and data structures (e.g., software) embodying or utilized by any one or more of the methodologies or functions described herein. These instructions (e.g., the instructions 1604), when executed by processors 1606, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

In various example embodiments, one or more portions of the network 1640 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1640 or a portion of the network 1640 may include a wireless or cellular network, and the coupling 1644 may be a Code Division Multiple Access (CDMA) connection, a Global System for Mobile communications (GSM) connection, or another type of cellular or wireless coupling. In this example, the coupling 1644 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1604 and/or data generated by or received and processed by the instructions 1604 may be transmitted or received over the network 1640 using a transmission medium via a network interface device (e.g., a network interface component included in the communication components 1638) and utilizing any one of a number of well-known transfer protocols (e.g., hypertext transfer protocol (HTTP)). Similarly, the instructions 1604 may be transmitted or received using a transmission medium via the coupling 1646 (e.g., a peer-to-peer coupling) to the devices 1642. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1604 for execution by the computer system 1600, and/or data generated by execution of the instructions 1604, and/or data to be operated on during execution of the instructions 1604, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS 100 bit generating cell
102 input stage
104 output stage
106 PFET unit
108 NFET unit
200 bit generating cell
202 NAND gates
204 first loop
206 second loop
208 inverters
210 inverters
300 unclonable bit pattern generator
302 bit generating cell array
304 error correction logic
400 tunable current mirror cell
402 adjustable current mirror
404 adjustable current mirror
406 bit generating cell
408 fixed current mirror
410 fixed current mirror
412 PFET unit
414 NFET unit
600 tunable current mirror cell
700 tunable current mirror cell
702 adjustable current mirror
704 adjustable current mirror
706 current source
708 bit generating cell
800 tunable edge chasing cell
802 inverters
804 inverters
806 adjustable current source
808 fixed current source
1002 circuit node
1004 pass-gate
1006 inverter
1008 tri-state inverter
1010 binary-ization stages
1012 output stage inverters
1102 controlled pass-gates
1104 fixed resistance pass-gates
1106 1X unit resistance
1108 2X unit resistance
1110 $2^N$X unit resistance
1112 adjustable resistance
1402 unclonable cell array
1404 computing system
1406 vehicle
1408 robot
1500 computing environment
1502 network
1504 mobile programmable device
1506 operating system
1508 app
1510 app
1512 unclonable bit array 1514 computer
1516 operating system
1518 application
1520 application
1522 unclonable bit array
1524 server
1526 operating system
1528 service
1530 service
1532 unclonable bit array
1534 interpreter
1536 driver
1538 driver
1540 driver
1542 driver
1544 file
1546 file
1548 plug-in
1600 computer system
1602 bit generating cell array
1604 instructions
1606 processors
1608 memory
1610 I/O components
1612 bus
1614 processor
1616 processor
1618 main memory
1620 static memory
1622 storage unit
1624 machine-readable medium
1626 output components
1628 input components
1630 biometric components
1632 motion components
1634 environmental components
1636 position components
1638 communication components
1640 network
1642 devices
1644 coupling
1646 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A circuit comprising:
   a plurality of bit generating cells;
   at least one characterization circuit coupled to influence outputs of the bit generating cells, the characterization circuit comprising:
   a first inverter;
   a second inverter;
   at least one pass-gate circuit coupled between the first inverter and the second inverter;
   logic to select and apply, based on varying an input and a bias of the first inverter, the outputs of a subset less than all of the bit generating cells.

2. The circuit of claim 1, wherein the circuit comprises an unclonable cell array.

3. The circuit of claim 2, the unclonable cell array configured to generate an encryption key.

4. The circuit of claim 1, wherein at least one of the bit generating cells comprises a plurality of stages, each stage comprising more inverters arranged in parallel than an immediately preceding stage.

5. The circuit of claim 4, further comprising at least one stage of inverters arranged in series.

6. The circuit of claim 1, wherein an output of the second inverter is coupled to an input of the second inverter.

7. The circuit of claim 1, wherein the at least one pass-gate circuit comprises a plurality of pass-gate circuits arranged in parallel.

8. The circuit of claim 7, the plurality of pass-gate circuits configured to receive a control code.

9. An encryption key generating circuit comprising:
   an unclonable cell array;
   at least one characterization circuit to vary inputs to bit generating cells in the unclonable cell array;
   the characterization circuit comprising a series arrangement of a first inverter, a second inverter, and a resistance coupled between the first inverter and the second inverter; and
   logic to configure a subset of the bit generating cells to generate the encryption key based on results of operating the characterization circuit.

10. The encryption key generating circuit of claim 9, wherein the resistance comprises at least one pass-gate circuit.

11. The encryption key generating circuit of claim 10, wherein the resistance comprises a plurality of pass-gate circuits arranged in parallel.

12. The encryption key generating circuit of claim 11, wherein the plurality of pass-gate circuits are configured to receive a digital control code to control the resistance value.

13. The encryption key generating circuit of claim 9, wherein at least some of the bit generating cells comprise a plurality of stages, each of the stages comprising inverters arranged in parallel.

14. The encryption key generating circuit of claim 13, wherein the fanout increases between each of the stages.

15. A method comprising:
   operating at least one characterization circuit to introduce changes to outputs of a plurality of bit generating cells;
   varying a resistance of the characterization circuit to introduce the changes; and
   selecting a subset less than all of the bit generating cells as a key value based the changes to the outputs.

16. The method of claim 15, further comprising varying an input and a bias signal of the characterization circuit to introduce the changes.

17. The method of claim 15, further comprising applying the key value as a master key to authenticate a software application.

18. The method of claim 15, further comprising applying the key value to perform encryption.

19. The method of claim 15, further comprising arranging the bit generating cells into an unclonable cell array.

* * * * *